United States Patent
Ishizu

[19]

[11] Patent Number: 5,829,544
[45] Date of Patent: Nov. 3, 1998

[54] DRIVE FORCE REDUCTION CONTROLLER FOR VEHICLE

[75] Inventor: Takeshi Ishizu, Zama, Japan

[73] Assignee: Nissan Motor Co., Ltd., Yokohama, Japan

[21] Appl. No.: 835,478

[22] Filed: Apr. 8, 1997

[30] Foreign Application Priority Data

Apr. 19, 1996 [JP] Japan .................................. 8-098592

[51] Int. Cl.⁶ .................................................. B60K 28/16
[52] U.S. Cl. .......................... 180/197; 303/141; 701/70
[58] Field of Search ........................... 180/197; 303/141, 303/142; 701/70

[56] References Cited

U.S. PATENT DOCUMENTS

| | | | |
|---|---|---|---|
| 4,985,838 | 1/1991 | Hashiguchi et al. | 180/197 X |
| 5,463,551 | 10/1995 | Milunas | 180/197 X |
| 5,466,199 | 11/1995 | Kobayashi et al. | 180/197 X |
| 5,473,544 | 12/1995 | Yamashita | 180/197 X |
| 5,609,218 | 3/1997 | Yamashita et al. | 180/197 |
| 5,630,480 | 5/1997 | Nishikata et al. | 180/197 |

FOREIGN PATENT DOCUMENTS

3-234964  10/1991  Japan .
3-246335  11/1991  Japan .

*Primary Examiner*—Robert J. Oberleitner
*Assistant Examiner*—Pamela J. Lipka
*Attorney, Agent, or Firm*—Foley & Lardner

[57] ABSTRACT

In a drive force reduction controller for reducing engine output when drive wheels slip, a first shift timing is applied to an automatic transmission during ordinary running, and a second shift timing is applied when engine output is reduced. The second shift timing is set so as to provide a shift-up at a vehicle speed higher than the first shift timing when the throttle opening is less than a predetermined opening such that the engine rotation speed after shift-up is equal to or greater than a predetermined rotation speed. It is also set to provide the shift-up at a vehicle speed lower than the first shift timing when the throttle opening is greater than a second predetermined opening greater than the first predetermined opening. In this way, stable drive force reduction control is performed regardless of the throttle opening, shift-up in the high vehicle speed region is prevented, and shocks due to shift-up of the transmission in the high vehicle speed region are mitigated.

14 Claims, 6 Drawing Sheets

DRIVE FORCE REDUCTION CONTROLLER FOR VEHICLE

FIELD OF THE INVENTION

This invention relates to drive force reduction control to prevent slip of vehicle wheels, and more specifically, to a relation between drive force reduction control and shift timing control of an automatic transmission.

BACKGROUND OF THE INVENTION

In a drive force reduction controller or traction control system (TCS) for reducing the drive force of drive wheels so that they do not slip causing a loss of acceleration performance when a vehicle is starting or accelerating, slipping of the drive wheels is prevented by decreasing engine output or activating a brake.

In Tokkai Hei 3-246335 published by the Japanese Patent Office in 1991, drive force is reduced by pausing fuel injection to a specific cylinder of the engine, and the number of cylinders in which fuel injection is paused is varied in stages according to the slip factor of the drive wheels.

A drive force reduction controller is also known wherein, in addition to the above fuel injection cut, a second throttle is provided in an engine intake passage in addition to the first throttle which responds to driver operations, and this second throttle is closed according to the slip of the drive wheels.

This type of controller has, however, a problem on a road with a low frictional coefficient. The engine is generally controlled so that it does not stall even when the throttles are fully closed. This is accomplished by supplying supplementary air and fuel to the engine and performing idle drive control to maintain a predetermined idle torque and idle rotation speed.

Therefore if a shift-up takes place when the first throttle opening is for example 2/8 or less, where 8/8 corresponds to full throttle opening, on a road with a low frictional coefficient such as an icy road, fuel cut may be prohibited by idle drive control so that the engine rotation speed does not fall below a predetermined idle rotation speed. As a result the drive wheel speed increases due to shift-up of the transmission while the engine rotation speed is maintained above the predetermined speed, so drive wheel slip is not prevented even if the second throttle is fully closed.

In this regard, Tokkai Hei 3-234964 published by the Japanese Patent Office in 1991 proposes to change the shift timing of the automatic transmission during drive force reduction control.

According to this technique, the shift timing of the automatic transmission is moved to higher vehicle speeds during drive force reduction control. This results in the shifting from first speed to second speed at a higher vehicle speed and helps to avoid the adverse effects of the idle drive control.

However if drive force reduction control starts when the first throttle opening is as high as for example 4/8, as the shift timing of the automatic transmission is moved to a higher vehicle speed, shift-up takes place at a higher engine speed region and jolts due to shifting of the transmission are likely to occur.

SUMMARY OF THE INVENTION

It is therefore an object of this invention to effectively perform drive force reduction control of a vehicle having an automatic transmission regardless of an opening of a first throttle.

It is another object of this invention to prevent speed change shocks due to change of shift timing.

In order to achieve the above objects, this invention provides a drive force reduction controller for such a vehicle that has an engine, a drive wheel and an automatic transmission. The engine is provided with an intake passage and a first throttle disposed in the passage. The first throttle has an opening varied according to an operation by a driver. The drive wheel is connected to the engine via the automatic transmission which varies and transmits a rotation of the engine to the drive wheel according to a running state of the vehicle. The controller comprises a mechanism for detecting a slip of the drive wheel on a road surface, a mechanism for determining that the drive wheel has slipped when the slip exceeds a predetermined level, a mechanism for reducing an engine output when the drive wheel has slipped, and a mechanism for applying a first shift timing to the automatic transmission when the engine output is not reduced, and applying a second shift timing to the automatic transmission when the engine output is reduced.

The second shift timing is set so as to provide a shift-up of the transmission at a vehicle speed higher than the first shift timing when the opening of the first throttle is less than a predetermined opening such that an engine rotation speed after shift-up is equal to or greater than a predetermined rotation speed, and to provide the shift-up at a vehicle speed lower than the first shift timing when the opening of the first throttle is greater than the predetermined opening.

It is preferable that controller further comprises a mechanism for estimating a frictional coefficient of the road surface, a mechanism for prohibiting the engine output reducing mechanism from reducing the engine output when the frictional coefficient is equal to or greater than a predetermined value, and a mechanism for prohibiting the shift timing applying mechanism from applying the second shift timing when the road surface frictional coefficient is equal to or greater than the predetermined value.

It is further preferable that the frictional coefficient estimating mechanism computes a road surface frictional coefficient $\mu$ based on a front/rear acceleration of the vehicle.

It is also preferable that the frictional coefficient estimating mechanism computes a road surface frictional coefficient $\mu$ based on a front/rear acceleration and a lateral acceleration of the vehicle.

It is also preferable that the engine output reducing mechanism comprises a second throttle disposed in the intake passage, a mechanism for closing the second throttle when the drive wheel has slipped, and a mechanism for temporarily stopping fuel supply to a specific cylinder of the engine when the drive wheel has slipped.

The details as well as other features and advantages of this invention are set forth in the remainder of the specification and are shown in the accompanying drawings.

DESCRIPTION OF THE PREFERRED EMBODIMENTS

Figure 1:
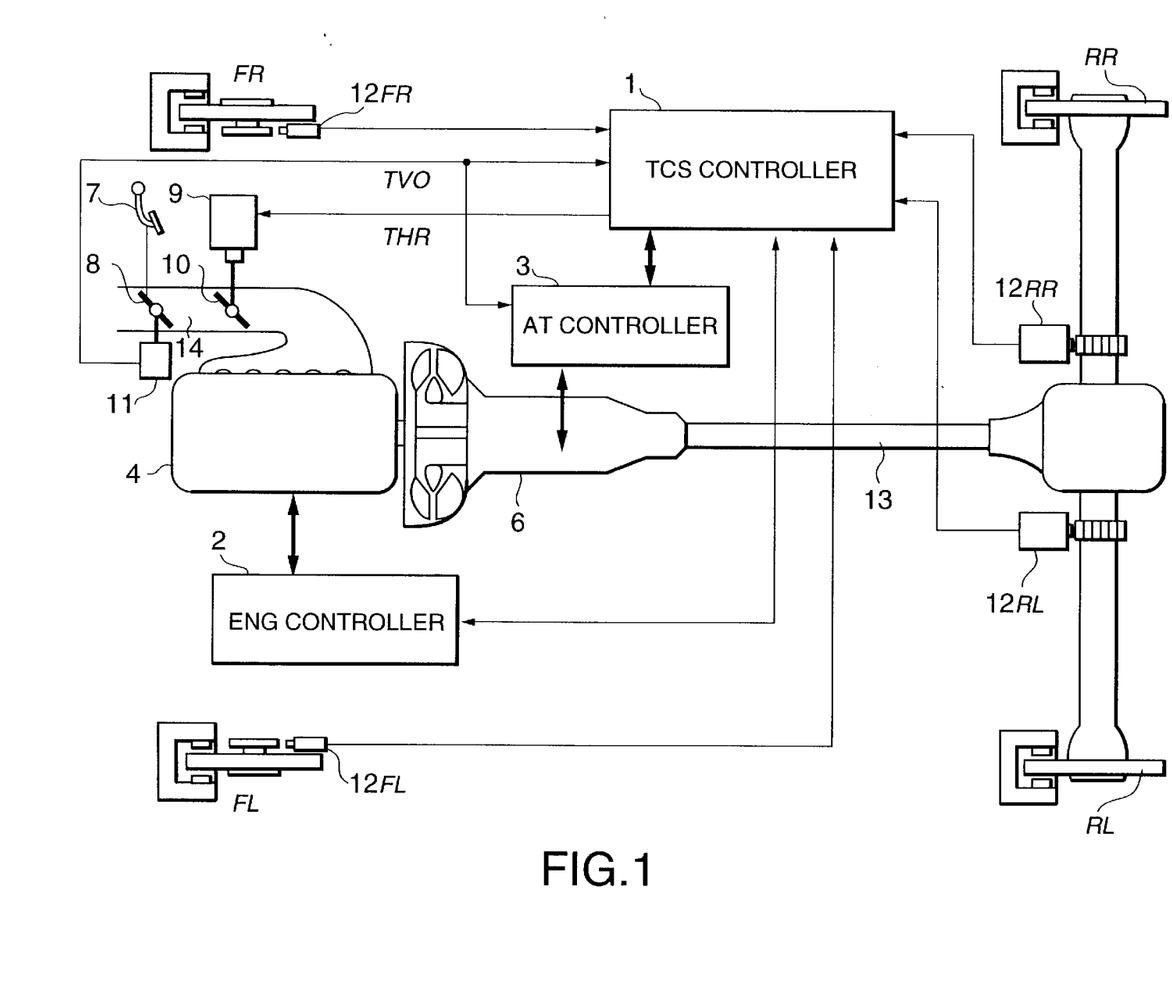
FIG. 1 is a schematic diagram of a drive force reduction controller according to this invention.

Referring to FIG. 1 of the drawings, a first throttle 8 and second throttle 10 are installed in an intake passage 14 of a multi-cylinder engine 4 of a vehicle. The opening of the first throttle 8 is varied in synchronism with an accelerator pedal 7. The opening of the second throttle 10 is varied by an actuator 9 in response to a control signal from a traction control controller (referred to hereafter as TCS controller).

A fuel injection timing and ignition timing of the engine 4 are controlled by an engine controller (abbreviated hereafter as ENG controller) 2 according to the engine driving state. The ENG controller 2 performs the aforesaid idle drive control so that the engine rotation speed is maintained at a predetermined idle rotation speed even when the first throttle and second throttle are both fully closed. The ENG controller 2 cuts fuel injection in a specific cylinder according to a drive force reduction control request input from the TCS controller 1.

An automatic transmission 6 is connected to the engine 4. The automatic transmission 6 changes the engine rotation in a ratio according to a command signal from an automatic transmission controller (abbreviated hereafter as AT controller) 3, and transmits it to a drive shaft 13. The rotation of the drive shaft 13 is transmitted to left and right rear wheels RR, RL, which are the drive wheels of the vehicle, via a differential gear. These controllers 1, 2, 3 comprise for example microcomputers.

The AT controller 3 controls the automatic transmission 6 so as to obtain a speed change ratio according to the vehicle driving state, e.g. the first throttle opening and vehicle speed.

A map in which the boundary between first speed and second speed of the automatic transmission 6 is specified according to the first throttle opening and vehicle speed is stored in the AT controller 3. The map provides two types of shift timing, i.e. an ordinary mode and a TCS mode. The former is applied during ordinary running, and the latter is applied during drive force reduction control by the TCS controller 1 based on a signal sent to the AT controller 3 from the TCS controller 1.

In order to perform the aforesaid control, the opening of the first throttle 8 is detected by a throttle opening sensor 11, and is input to the TCS controller 1 and AT controller 3.

Further, rotation speed signals from wheel speed sensors 12FR, 12FL, 12RR, 12RL which detect the rotation speeds of the wheels or wheel shafts are respectively input to the TCS controller 1.

The TCS controller 1 detects the slip state of the drive wheels RR, RL and the front/rear acceleration Xg of the vehicle based on these wheel speeds VWFR, VWFL, VWRR, VWRL.

When the slip of the drive wheels RR, RL exceeds a predetermined level, the opening of the second throttle 10 is reduced via the actuator 9 and fuel injection to a specific cylinder is cut by a signal output to the ENG controller 2 so that the output of the engine 4 decreases. Simultaneously, the TCS controller 1 also sends a signal showing that the vehicle is under drive force reduction control to the AT controller 3.

Figure 3:
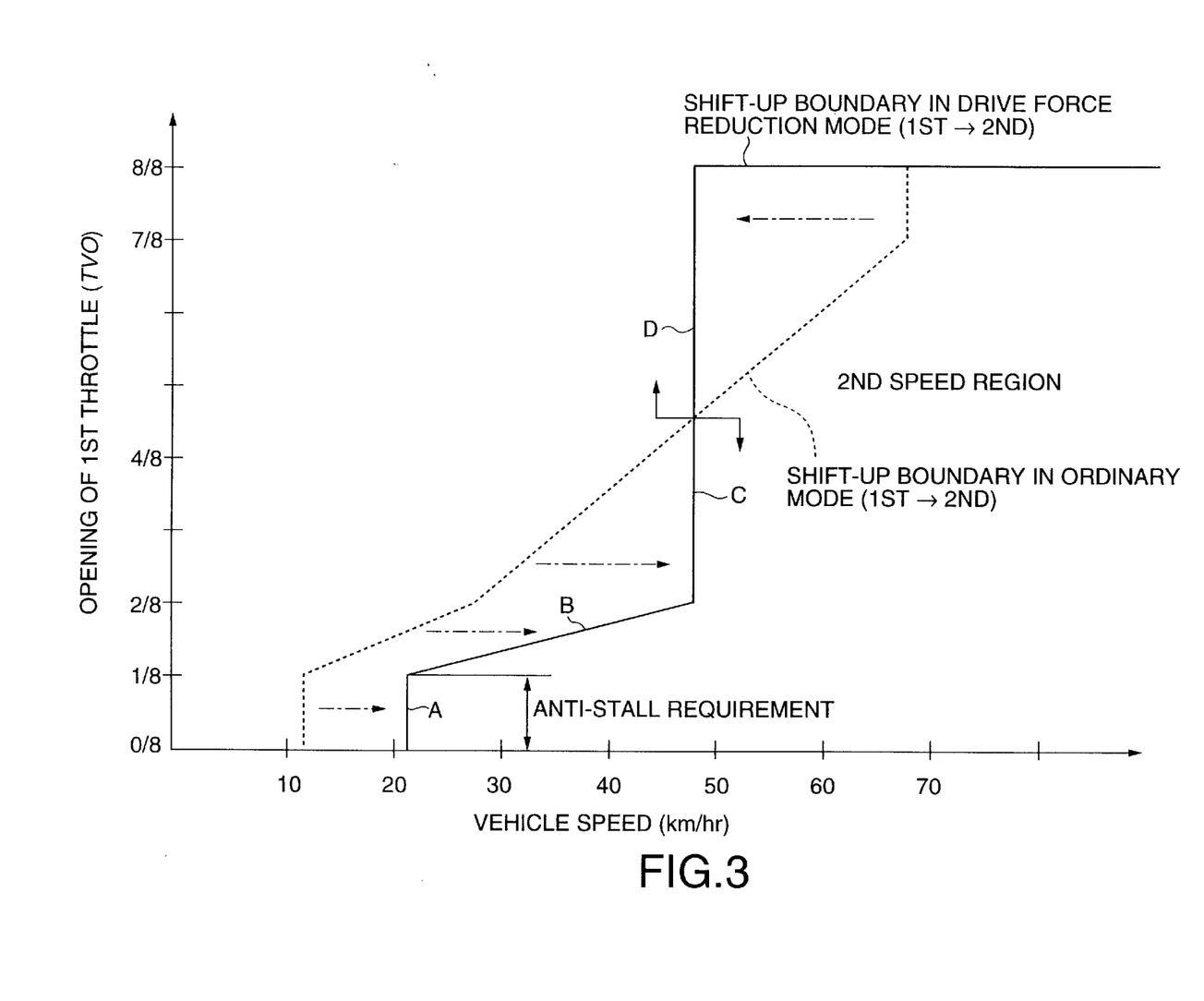
FIG. 3 is a diagram specifying shift timing of an automatic transmission in different modes according to this invention.

Due to this input signal from the TCS controller 1, the AT controller 3 changes over the shift timing from the ordinary mode for ordinary running to the TCS control mode for drive force reduction control, as shown in FIG. 3.

Next, the shift timing control performed by the AT controller 3 will be described taking a shift from first speed to second speed shown in FIG. 3 as an example.

First, the ordinary mode shown by the broken line in the figure is the same as the shift timing during ordinary running disclosed in the aforesaid prior art Tokkai Hei 3-234964.

On the other hand, the TCS control mode shown by the solid line in the figure is determined not by a parallel shift of the ordinary mode to higher speeds as in the aforesaid prior art, but based on engine control and drive force reduction control. First, sections A and B when the first throttle opening TVO is 2/8 or less specify that the shift timing from first speed to second speed is shifted to higher speed so that the speed change operation is delayed during drive force reduction control.

In particular, section A where the throttle opening TVO is 1/8 or less specifies that the vehicle speed is set such that the engine speed Ne is no less than the idle rotation speed under idle drive control even after shift-up. In other words, when shift-up is performed at the vehicle speed specified by the section A during drive force reduction control, fuel cut by the drive force reduction control is not disturbed by idle drive control.

A section C where the throttle opening TVO is 2/8–4/8 (intermediate opening) specifies that the speed change boundary moves to higher speed than the ordinary mode, and speed change during drive force reduction control is delayed.

However, as shown by a section D, when the throttle opening TVO exceeds 4/8 (large opening), the speed change boundary is shifted to lower speed than the ordinary mode.

This is to prevent speed change from being performed in the high engine speed region as a result of delaying shift-up during drive force reduction control, and to prevent shocks from occurring due to upshift in the high engine speed region.

Figure 2:
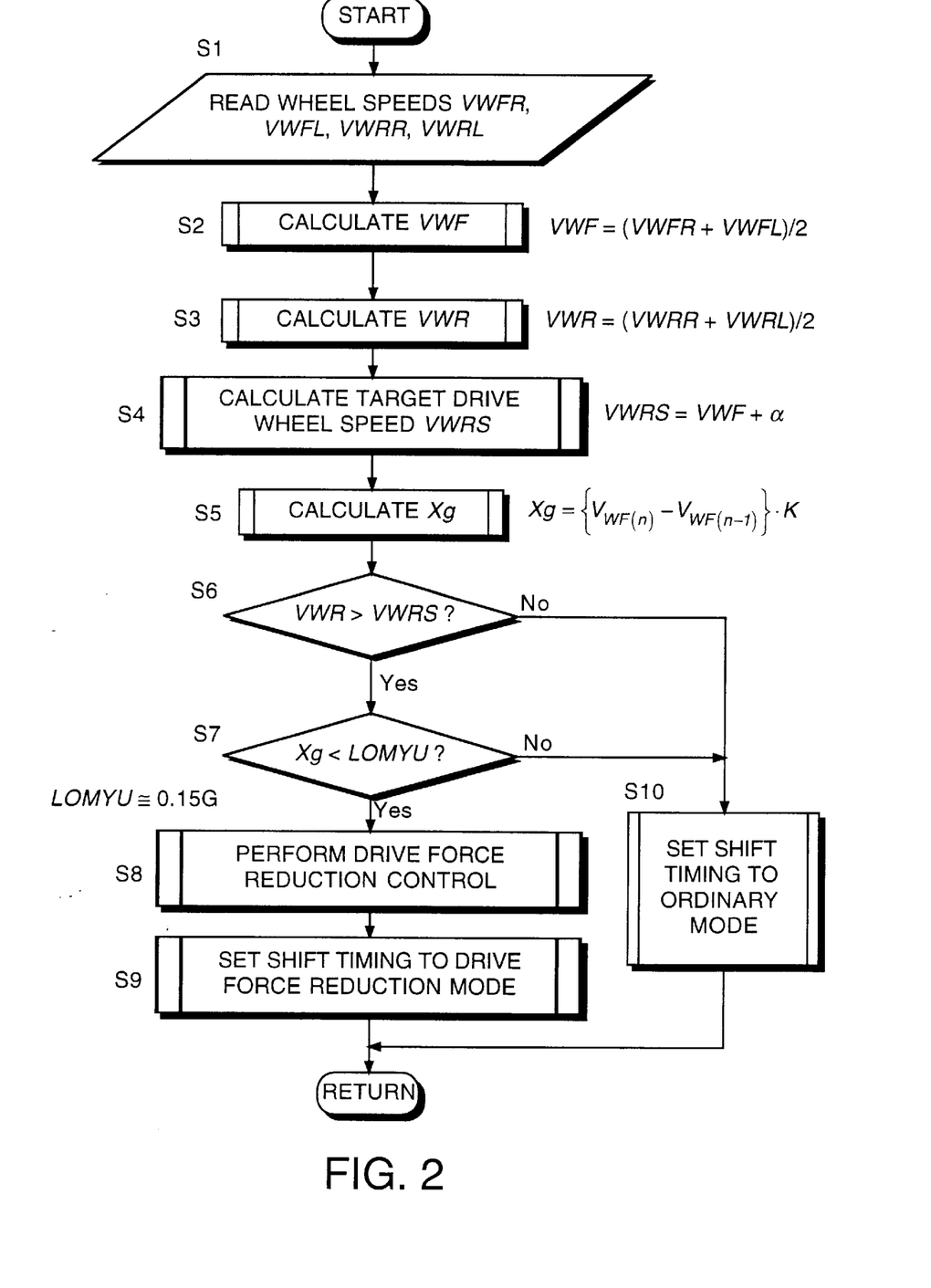
FIG. 2 is a flowchart describing a process of drive force reduction control and shift timing control performed by the controller.

Next, the drive force reduction control process and shift timing control process performed by the TCS controller 1 and AT controller 3 will be described with reference to the flowchart of FIG. 2. This process is executed at a predetermined interval.

Steps S1–S8 show the control performed by the TCS controller 1, and steps S9, S10 show the control performed by the AT controller 3 according to a command signal from the TCS controller 1.

In the step S1, the TCS controller 1 reads the outputs of wheel speed sensors 12FR-12RL, and calculates the speeds VWFR, VWFL, VWRR and VWRL of the wheels.

In the step S2, the average speed VWF of the driven wheels is calculated from the average of the left and right front wheel speeds VWFR, VWFL, and in the step S3, the average speed VWR of the drive wheels is calculated from the average of the left and right rear wheel speeds VWRR, VWRL.

In the step S4, a target value VWRS of the drive wheel speed, which is a target value of drive force reduction control, is set based on the average driven wheel speed VWF which represents the present vehicle speed.

Figure 4:
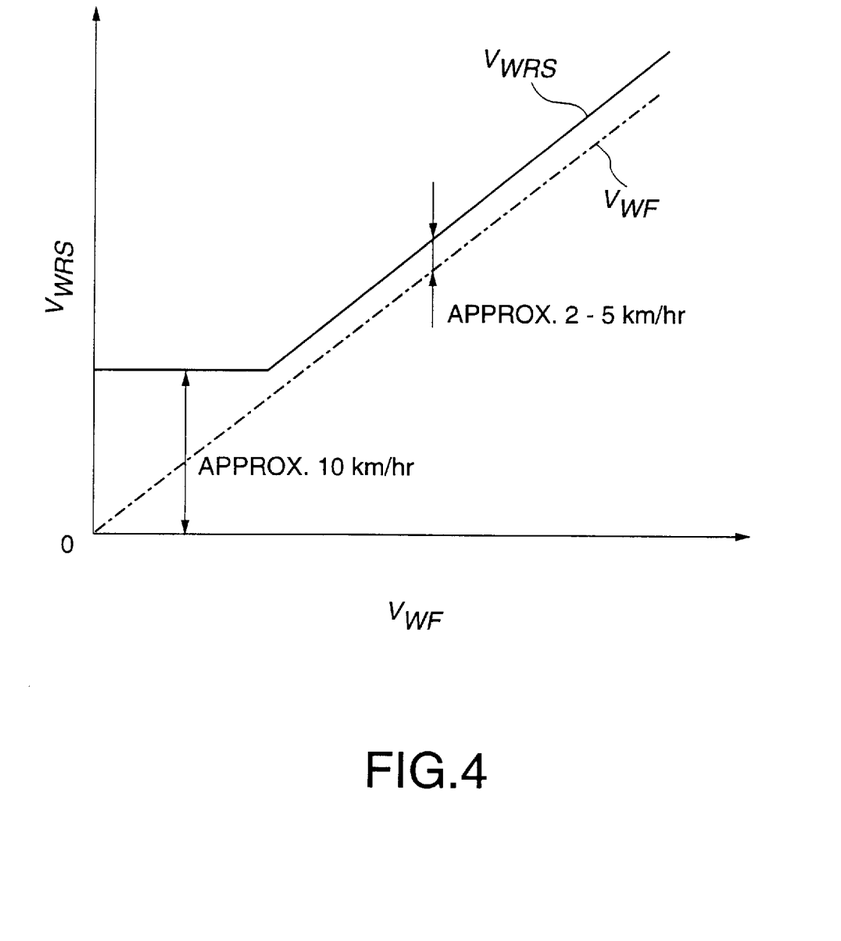
FIG. 4 is a graph showing a relation between a target drive wheel speed and an average driven wheel speed set by the controller.

Herein, the target drive wheel speed VWRS is set to a constant value (e.g. 10 km/hr) in the low speed region when the average driven wheel speed VWF is less than a predetermined value, as shown in FIG. 4. In the speed region exceeding this predetermined value, the target drive wheel speed VWRS is obtained by adding a predetermined value α (e.g. 2–5 km/hr) to the average driven wheel speed VWF.

$$VWRS = VWF + \alpha$$

In the step S5, the front/rear acceleration Xg of the vehicle is found by multiplying the present value $VWF_{(n)}$ of the average driven wheel speed and its value $VWF_{(n-1)}$ on the immediately preceding occasion by a predetermined conversion constant K.

$$Xg = \{VWF_{(n)} - VWF_{(n-1)}\} \times K$$

As this front/rear acceleration Xg varies according to the frictional coefficient of the road surface $\mu$, this front/rear acceleration Xg is treated as a value representing the frictional coefficient $\mu$ of the road surface.

In the step S6, slip of the drive wheels is detected by determining whether or not the average drive wheel speed VWR has exceeded the target drive wheel speed VWRS. When the average drive wheel speed VWR has exceeded the target drive wheel speed VWRS, it is determined that the drive wheels have slipped and the routine proceeds to a step S7. When the average drive wheel speed VWR is equal to or less than the target drive wheel speed VWRS, it is determined that the vehicle is in the ordinary running state and the routine proceeds to a step S10.

In the step S7, it is determined whether or not the present a road surface is a road of low frictional coefficient such as an icy road. By comparing the front/rear acceleration Xg found in the step S5 with a predetermined value LOMYU, it is determined from the front/rear acceleration Xg whether the present road is a road of low frictional coefficient or a road of high frictional coefficient. The predetermined value LOMYU is an acceleration set to detect a road of low frictional coefficient, and may be set to for example 0.15 G.

When the front/rear acceleration Xg of the vehicle is equal to or greater than the predetermined value LOMYU, the shift timing is set to the ordinary mode and the routine proceeds to the step S10.

When the front/rear acceleration Xg is less than the predetermined value LOMYU, slip of the drive wheels RR, RL must be suppressed to maintain stability of the vehicle. In this case, in the step S8, the opening of the second throttle 10 is reduced, a fuel cut request signal is issued to the ENG controller 2, and fuel cut is performed in a predetermined cylinder of the engine 4. This drive force reduction control is disclosed in the aforesaid prior art Tokkai Hei 3-246335.

After the TCS controller 1 starts drive force reduction control, a signal is emitted to the AT controller 3 in the step S9 showing that the vehicle is under drive force reduction control. In response to this signal, the AT controller 3 applies the drive force reduction mode to the shift timing as shown in FIG. 3.

On the other hand in the step S10, the AT controller 3 applies the ordinary mode to the shift timing.

By performing the above control at a predetermined interval, the drive wheels are prevented from slipping when the vehicle is starting or accelerating on a road of low frictional coefficient, and shocks due to shifting of the transmission are reduced.

For example, when the vehicle starts on a road of low frictional coefficient such as an icy road and the drive wheels slip when the first throttle opening TVO is 1/8, the TCS controller 1 reduces the opening of the second throttle 10, a drive force reduction control request is output to the ENG controller 2, and fuel cut is performed to stop slip of the drive wheels.

Figure 5:
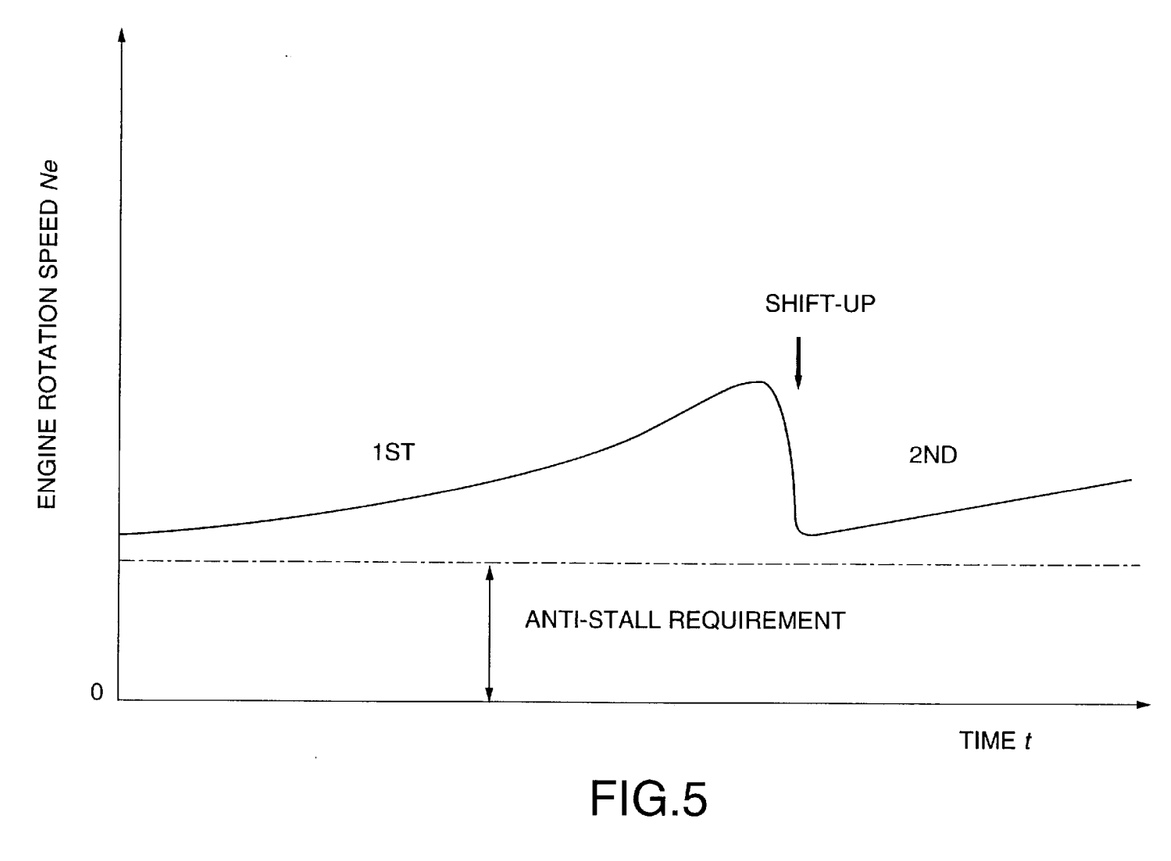
FIG. 5 is a timing chart showing a variation of engine rotation speed under control by the controller.

As the shift timing of the automatic transmission 6 is changed over to the drive force reduction mode due to low frictional coefficient, the speed of shift-up from first speed to second speed increases as shown by the section A of FIG. 3. The vehicle speed increases as the slip of the drive wheels decreases, and the automatic transmission 6 shifts up from first speed to second speed when the vehicle speed exceeds approx. 20 km/h. As a result, the engine rotation speed Ne temporarily decreases as shown in FIG. 5, and then again increases with the opening of the first throttle and second throttle.

As the shift-up speed from first speed to second speed increases due to application of the drive force reduction mode in this way, the engine rotation speed does not fall below the rotation speed maintained by idle drive control of the ENG controller 2 when shift-up is performed at a timing specified by the section A of FIG. 3. Hence even after a shift-up to second speed, the ENG controller 2 can continue fuel cut according to a request from the TCS controller 1. Also even when the first throttle opening TVO is small, slip of the drive wheels is definitively prevented by adequately reducing drive force, and stability of the vehicle is maintained.

If the drive wheels slip when the first throttle opening TVO is greater than 4/8, slip of the drive wheels is stopped by drive force reduction control and the vehicle speed increases. When the vehicle speed exceeds the section D shown in FIG. 3, the AT controller 3 performs a shift-up from first speed to second speed. This shift-up is performed at a lower vehicle speed (approx. 50 km/hr) than the shift-up position in the ordinary mode (approx. 70 km/hr when TVO =7/8). Because of this shift up at the lower vehicle speed, the engine rotation speed is kept lower than the high rotation speed area, and shock due to shift-up in the high rotation speed area which may occur in the aforesaid prior art Tokkai Hei 3-234964, does not occur.

In the drive force reduction mode of FIG. 3, from when the first throttle opening TVO exceeds 1/8 up to 4/8, the shift-up position is shifted to higher speed than the shift-up position of the ordinary mode. Therefore by delaying speed changes during drive force reduction control, the effect of shift-up on traction control is eliminated and stability of the vehicle is improved.

Further in the step S7, even when the drive wheel speed VWR exceeds the target drive wheel speed VWRS in the step S6, drive force reduction control is not performed on a road of high frictional coefficient provided that the coefficient $\mu$ exceeds the predetermined value LOMYU, and as the shift timing also is not modified, the drive force required for acceleration on a road of high frictional coefficient is maintained.

Figure 6:
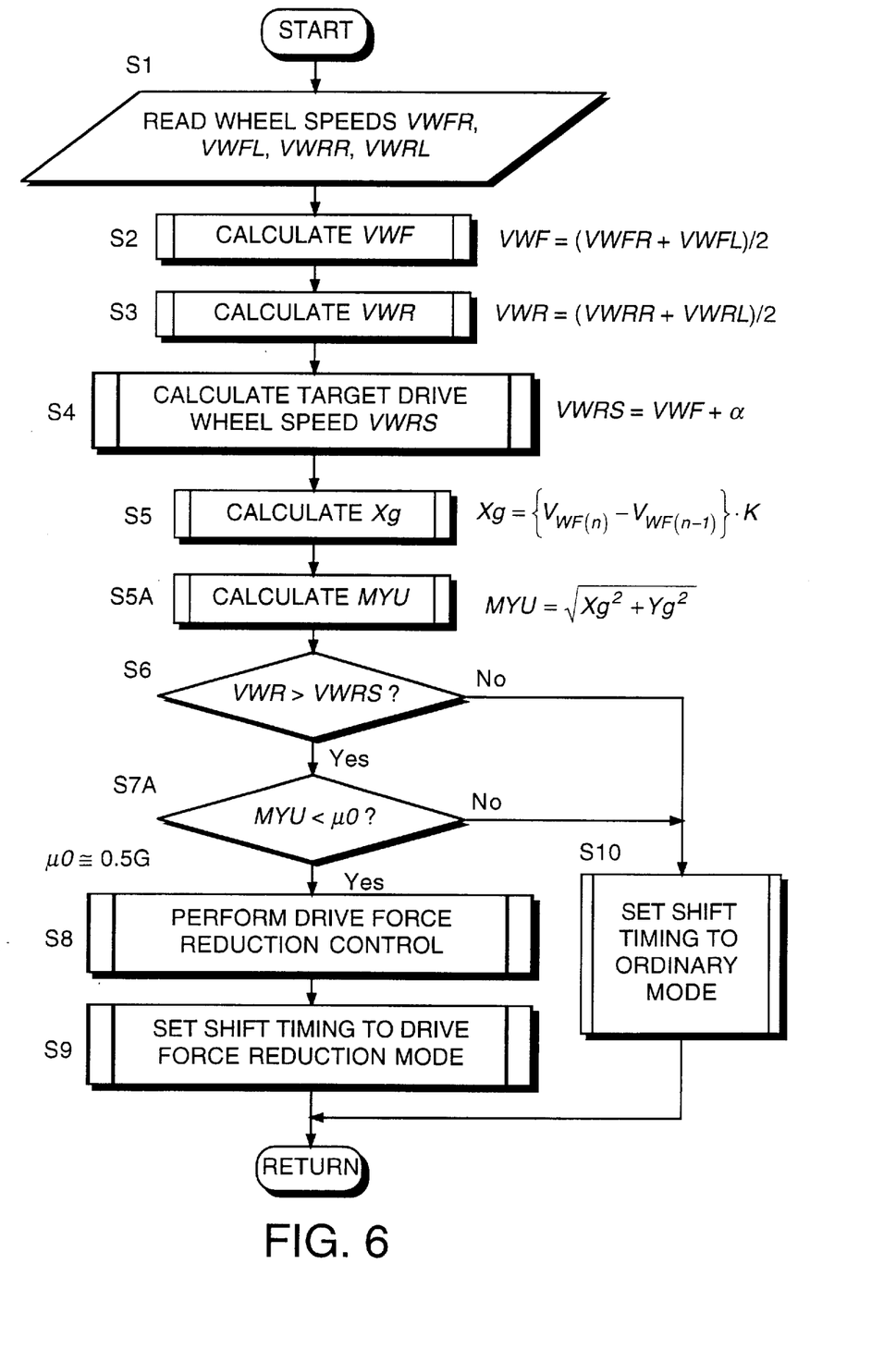
FIG. 6 is similar to FIG. 2, but showing another embodiment of this invention.

FIG. 6 shows another embodiment of this invention.

According to this embodiment, a lateral acceleration Yg of the vehicle is included in the calculation of the value which represents the road surface frictional coefficient $\mu$, and the vehicle is equipped with a sensor to measure the lateral acceleration, not shown. A representative value MYU of the frictional coefficient $\mu$ is then computed by the following equation from the detected lateral acceleration Yg and front/rear acceleration Xg in a step S5A of FIG. 6.

$$MYU = \sqrt{Xg^2 + Yg^2}$$

In a step S7A, it is determined whether or not $MYU < \mu_0$. $\mu_0$ is set to for example 0.5 G. When MYU is less than $\mu_0$, it is determined that the road has a low frictional coefficient, and when MYU is equal to or greater than $\mu_0$ it is determined that the road has a high frictional coefficient.

Hence by making the frictional coefficient $\mu$ of the road surface a parameter of the front/rear acceleration Xg and the lateral acceleration Yg, the detecting precision of low frictional coefficient and the precision of drive force reduction control during when the vehicle is accelerating on a curved path are improved.

According to the above description, the shift-up from first speed to second speed during drive force reduction control was described as shown in FIG. 3, however the shift-down timing may also be set according to the first throttle opening TVO in the same way. Further, the drive force reduction mode may be set for other shift timings, e.g. from second speed to third speed.

Although the shift timing during ordinary running set by the AT controller 3 is limited to the ordinary mode in the above embodiments, a plurality of shift timings may be set in addition to the ordinary mode such as a power mode and an economy mode. In this case, the AT controller 3 changes over between a plurality of shift timings according to a request from the TCS controller 1.

Prior to the present patent application, the inventor has filed another patent application Ser. No. 08/662,950 to the U.S. Pat. No. Office, wherein the timing of shift-up is shifted to higher vehicle speed for low engine output.

This invention however differs from the above Ser. No. 08/662,950 in that the shift timing is set so that the engine rotation speed after shift-up is equal to or greater than a predetermined rotation speed.

The embodiments of this invention in which an exclusive property or privilege is claimed are defined as follows:

1. A drive force reduction controller for use with a vehicle, said vehicle having an engine provided with an intake passage and a first throttle disposed in said passage, said throttle having an opening varied according to an operation by a driver, and a drive wheel connected to said engine via an automatic transmission which varies and transmits a rotation of said engine to said drive wheel according to a running state of said vehicle, said controller comprising:

means for detecting a slip of said drive wheel on a road surface, means for determining that said drive wheel has slipped when said slip exceeds a predetermined level, means for reducing an engine output when said drive wheel has slipped, and means for applying a first shift timing to said automatic transmission when said engine output is not reduced, and applying a second shift timing to said automatic transmission when said engine output is reduced, wherein said second shift timing is set so as to provide a shift-up of the transmission at a vehicle speed higher than said first shift timing and to provide an engine rotation speed after shift-up equal to or greater than a predetermined rotation speed, when the opening of said first throttle is less than a predetermined opening, and to provide the shift-up at a vehicle speed lower than said first shift timing when the opening of said first throttle is greater than the predetermined opening.

2. A drive force reduction controller as defined in claim 1, further comprising means for estimating a frictional coefficient of the road surface and means for prohibiting said shift timing applying means from applying said second shift timing when said road surface frictional coefficient is equal to or greater than a predetermined value.

3. A drive force reduction controller as defined in claim 2, wherein said frictional coefficient estimating means computes a road surface frictional coefficient $\mu$ based on a front/rear acceleration of the vehicle.

4. A drive force reduction controller as defined in claim 2, wherein said frictional coefficient estimating means computes a road surface frictional coefficient $\mu$ based on a front/rear acceleration and a lateral acceleration of the vehicle.

5. A drive force reduction controller as defined in claim 1, wherein said engine output reducing means comprises a second throttle disposed in said intake passage, means for closing said second throttle when said drive wheel has slipped, and means for temporarily stopping fuel supply to a specific cylinder of said engine when said drive wheel has slipped.

6. A drive force reduction controller for use with a vehicle, said vehicle having an engine provided with an intake passage and a first throttle disposed in said passage, said throttle having an opening varied according to an operation by a driver, and a drive wheel connected to said engine via an automatic transmission which varies and transmits a rotation of said engine to said drive wheel according to a running state of said vehicle, said controller comprising:

a detector of a slip of said drive wheel on a road surface, a second throttle disposed in said passage, a detector of an engine output power, a detector of an opening of said first throttle, and a microprocessor programmed to:

determine that said drive wheel has slipped when said slip exceeds a predetermined level, output a first signal to reduce an opening of said second throttle when said drive wheel has slipped, output a second signal to apply a first shift timing to said automatic transmission when said engine output is not reduced, and output a third signal to apply a second shift timing to said automatic transmission when said engine output is reduced, wherein said second shift timing is set so as to provide a shift-up of the transmission at a vehicle speed higher than said first shift timing and to provide an engine rotation speed after shift-up equal to or greater than a predetermined rotation speed, when the opening of said first throttle is less than a predetermined opening, and to provide the shift-up at a vehicle speed lower than said first shift timing when the opening of said first throttle is greater than the predetermined opening.

7. A drive force reduction controller as defined in claim 6, wherein said controller further comprises a detector of a front/rear acceleration of the vehicle, and said microprocessor is further programmed to estimate a frictional coefficient of the road surface from said vehicle acceleration and not to output said third signal when said road surface frictional coefficient is equal to or greater than a predetermined value.

8. A drive force reduction controller as defined in claim 6, wherein said controller further comprises a detector of a front/rear acceleration of the vehicle and a detector of a lateral acceleration of the vehicle, and said microprocessor is further programmed to estimate a frictional coefficient of the road surface from said front/rear acceleration and lateral acceleration of the vehicle and not to output said third signal when said road surface frictional coefficient is equal to or greater than a predetermined value.

9. A drive force reduction controller as defined in claim 6, wherein said microprocessor is further programmed to output a fourth signal to temporarily stop fuel supply to a specific cylinder of said engine when said drive wheel has slipped.

10. A drive force reduction control method for a vehicle, said vehicle having an engine provided with an intake passage and a first throttle disposed in said passage, said throttle having an opening varied according to an operation by a driver, and a drive wheel connected to said engine via an automatic transmission which varies and transmits a rotation of said engine to said drive wheel according to a running state of said vehicle, said method comprising the steps of:

detecting a slip of said drive wheel on a road surface, determining that said drive wheel has slipped when said slip exceeds a predetermined level, reducing an engine output when said drive wheel has slipped, applying a first shift timing to said automatic transmission when said engine output is not reduced, and applying a second shift timing to said automatic transmission when said engine output is reduced, wherein said second shift timing is set so as to provide a shift-up of the transmission at a vehicle speed higher than said first shift timing and to provide an engine rotation speed after shift-up equal to or greater than a predetermined rotation speed, when the opening of said first throttle is less than a predetermined opening, and to provide the shift-up at a vehicle speed lower than said first shift timing when the opening of said first throttle is greater than the predetermined opening.

11. A drive force reduction control method as defined in claim 10, wherein said method further comprises a step of estimating a frictional coefficient of the road surface and a step of prohibiting said shift timing applying step from applying said second shift timing when said road surface frictional coefficient is equal to or greater than a predetermined value.

12. A drive force reduction control method as defined in claim 11, wherein said frictional coefficient estimating step comprises a step of computing a road surface frictional coefficient $\mu$ based on a front/rear acceleration of the vehicle.

13. A drive force reduction control method as defined in claim 11, wherein said frictional coefficient estimating step comprises a step of computing a road surface frictional coefficient $\mu$ based on a front/rear acceleration and a lateral acceleration of the vehicle.

14. A drive force reduction control method as defined in claim 10, wherein said engine output reducing step comprises a step of reducing an opening of a second throttle disposed in said intake passage when said drive wheel has slipped, and a step of temporarily stopping fuel supply to a specific cylinder of said engine when said drive wheel has slipped.

* * * * *